United States Patent [19]
Oka et al.

[11] Patent Number: 5,970,433
[45] Date of Patent: Oct. 19, 1999

[54] LASER OBSTACLE DETECTION METHOD AND SENSOR

[75] Inventors: Koji Oka; Masujiro Hisatani; Hiroshi Imajo; Toru Takehara, all of Tamano, Japan

[73] Assignee: Mitsui Engineering & Shipbuilding Co. Ltd., Tokyo, Japan

[21] Appl. No.: 08/799,484

[22] Filed: Feb. 12, 1997

[30] Foreign Application Priority Data

Jun. 24, 1996 [JP] Japan .................................. 8-182814

[51] Int. Cl.$^6$ ...................................................... G01C 3/00
[52] U.S. Cl. ........................... 702/159; 702/40; 702/150; 356/4.07; 359/155; 250/559.13; 250/559.39
[58] Field of Search ..................................... 364/525, 526, 364/805, 556, 551.01, 561, 580, 604; 701/28, 96, 211, 301; 340/901, 903, 904, 937, 942, 435, 436, 437, 433; 342/69, 70, 54; 356/4.01, 4.07, 5.01, 152.3, 4.04, 375, 380, 386, 387, 5.03; 180/167, 169; 359/205, 208, 221, 154, 155, 561, 731, 857, 861, 864, 869; 250/559.38, 559.39, 559.13, 559.26, 234–236; 372/15, 24; 235/467; 702/40, 94, 97, 134, 135, 136, 143, 150, 159, 158, 172

[56] References Cited

U.S. PATENT DOCUMENTS

| | | | |
|---|---|---|---|
| 4,998,259 | 3/1991 | Chandra et al. | 372/15 |
| 5,455,669 | 10/1995 | Wetteborn | 356/5.01 |
| 5,489,149 | 2/1996 | Akasu | 356/5.01 |
| 5,572,008 | 11/1996 | Sahai et al. | 235/467 |
| 5,604,580 | 2/1997 | Uehara | 340/435 |
| 5,612,781 | 3/1997 | Ohtomo et al. | 356/152.3 |
| 5,689,328 | 11/1997 | Katayama | 356/4.01 |
| 5,745,050 | 4/1998 | Nakagawa | 340/903 |

FOREIGN PATENT DOCUMENTS

| | | |
|---|---|---|
| A-0 269 902 | 6/1988 | European Pat. Off. . |
| A-3-177905 | 8/1991 | Japan . |
| A-4-27331 | 1/1992 | Japan . |
| A-4-67641 | 3/1992 | Japan . |
| A-2-161 340 | 1/1986 | United Kingdom . |
| A-2 274 368 | 7/1994 | United Kingdom . |
| A-2 290 918 | 1/1996 | United Kingdom . |

*Primary Examiner*—Hal Dodge Wachsman
*Attorney, Agent, or Firm*—Oliff & Berridge, PLC

[57] ABSTRACT

A sensor detects the presence or the absence of an obstacle by radiating a laser beam to the outside of a casing through a light projecting mirror and by letting the reflected light from an obstacle enter a light receiving element through a light receiving mirror. A light projecting window with a light projecting mirror positioned and a light receiving window with a light receiving mirror are positioned in the casing with a space therebetween to prevent reflected light from directly entering the light projecting window. The mirrors are attached to a rotation shaft of a motor, or rotation shafts of motors, synchronously rotatable provided between both mirrors. The optical axis of light radiated to the outside of the casing is set to face in a higher direction than horizontal to radiate in a cone-shaped form. By comparing a received light signal from a light receiving circuit to an output signal from a circuit for a previously set threshold, which has a correlation between detected distance and light intensity, a light receiving trigger is output. The distance is calculated when a signal is greater than the threshold. The presence or the absence of an obstacle is determined by the detection of reflected light intensity. This laser obstacle detection method and sensor, which can be used on an automated guided vehicle (AGV), will not misdetect rainfall as an obstacle.

20 Claims, 6 Drawing Sheets

LASER OBSTACLE DETECTION METHOD AND SENSOR

BACKGROUND OF THE INVENTION

The present invention relates to a laser obstacle detection method and sensor, and particularly to a laser obstacle detection method and sensor which can effectively prevent misdetection of an object which is not essentially an obstacle, such as raindrops, snowfall, or the like, as an obstacle, when equipped on a vehicle for detecting an obstacle in a traveling area.

Generally, an electromagnetic induction automated guided vehicle automatically traveling on a specified traveling road along an induction line by detecting an induction signal outputted from an induction line previously laid on the road surface (Japanese Patent Application Publication No. 4-67641), and an automatic driving system for vehicles driving a guided vehicle based on an amount of relative displacement between a white line laid on a road and the guided vehicle which is detected by a CCD camera (Japanese Patent Application Laid-open No. 4-27331) are known to be used as an automatic driving system of an automated guided vehicle.

Since laying an induction line on the entire traveling reference line is restricted by cost and has many inconveniences, such as trouble of a broken line and so on caused by vehicles and so on traveling on the induction line, a system is proposed which travels and is induced by bodies as detecting signs consisting of magnets which are embedded at specified intervals on the traveling reference line (Japanese Patent Application Laid-open No. 3-177905). A traveling route in which a magnet is embedded with a specified interval provided is formed and a sensor for calculating displacement by detecting magnetism of each magnet is attached on a vehicle body. An azimuth sensor is provided on the vehicle body, and by calculating the deviation from azimuth information previously set between adjacent magnets, the vehicle automatically travels along the route to its goal.

Incidentally, for an automatically traveling automated guided vehicle, when moving along the traveling route prescribed in the above, it is important to take a measure such as an automatic halt and so on when the existence of an obstacle is recognized on a traveling route, and to this end, an obstacle detection sensor is provided. As sensors of this kind, a method for radiating a ultrasonic wave and a method for radiating a millimeter wave are conventionally known, however they have disadvantages of low responsiveness resulting in detecting an obstacle at only one point and being unable to detect human beings, of low sensitivity in rainfall and snowfall, and of catching noise and so on. Therefore, recently there has been a tendency to use an obstacle detection sensor using a laser beam for reasons of having high resolution at a long distance with high directivity and surely detecting human beings. Such a laser sensor radiates a laser beam projected from the light source in a side direction of the vehicle, then detects the reflected light from an obstacle in the range of a traveling route and calculates the distance to determine when to halt the vehicle and so on in accordance with the extent of the distance to the obstacle. The conventional laser obstacle detection sensors are provided with a light sending and receiving window at the casing for projecting a laser beam from the window to the outside through a light projecting mirror, and for detecting the reflected light from the same window through a half mirror. The reflected light is input to a photoelectric element, and the time from the radiation to the reception of the reflected light is calculated to calculate the distance. In order that precipitation such as raindrops are not detected as an obstacle, a method for detecting reflected light intensity is adopted, and generally only a signal with a reflection intensity greater than a specified threshold is detected as an obstacle.

However, in the conventional laser obstacle detection sensor, there is a disadvantage of being unable to surely prevent misdetection of raindrops as a ghost obstacle at rainfall, though a method for detecting an obstacle only when reflected light with intensity more than a specified level is detected especially from a viewpoint that reflected light intensity from raindrops is small. On the window forming the laser beam projecting portion and receiving portion, a light transmittable protective plate such as acrylic resin or the like is attached and there are disadvantages of detecting the vehicle itself equipped with the sensor being detected as an obstacle and of mistakenly recognizing reflected light from contacting water drops which are directly received when raindrops and so on contact this protective plate. Further, in an automated guided vehicle or the like requiring a sensor of this kind, the inclination of a vehicle body caused by partial loading, or the detection of the ground surface as an obstacle due to the vibration during traveling occur, and these things empirically occur especially in rainfalls.

SUMMARY OF THE INVENTION

Mitigating the above-described conventional disadvantages, an object of the present invention is to provide a laser obstacle detection method and sensor which are especially effective to be equipped on an automated guided vehicle (AGV) and which do not misdetect raindrops and so on as an obstacle. The second object of the present invention is to provide a laser obstacle detection method and sensor which can prevent the misdetection of raindrops in contact with the laser beam projecting and receiving windows. Further, the third object of the present invention is to provide a laser obstacle detection method and sensor which can prevent the misdetection of a ground surface on which a vehicle is traveling as an obstacle.

The present invention relates to a sensor for detecting the presence or the absence of an obstacle by radiating laser beam radiated from a laser beam source to the outside of a casing through the medium of a light projecting mirror and by letting the reflected light from an obstacle or the like enter a light receiving element through the medium of a light receiving mirror and particularly to a sensor. A light projecting window with a light projecting mirror positioned so as to face the light projecting window and a light receiving window with a light receiving mirror positioned so as to face the light receiving window are formed, with a space provided between, in the casing to prevent reflected light directly from the light projecting window from being received. The above-described mirrors are attached to a rotation shaft of the same motor or rotation shafts of motors synchronously rotatable which is, or are, provided between both the mirrors to enable synchronized rotation of the light projecting mirror and the light receiving mirror. An optical axis of light radiated to the outside of the casing through the medium of a reflecting surface of said light projecting mirror is set to face in a higher direction than the horizontal line to radiate projecting laser beam as a rotating laser beam in a cone-shaped form. By comparing a received light signal from a light receiving circuit to an output signal from a circuit for a previously set threshold having a correlation between detected distance and light intensity, a light receiving trigger is outputted and the distance is calculated when a signal is greater than the threshold. The presence or the absence of an obstacle is determined by the detection of reflected light intensity with the above-described threshold as a boundary. Thereby the present invention is especially effective when equipped on an automated guided vehicle (AGV) wherein the laser obstacle detection method and sensor do not misdetect rainfall or the like as an obstacle.

DETAILED DESCRIPTION OF PREFERRED EMBODIMENTS

Figure 1:
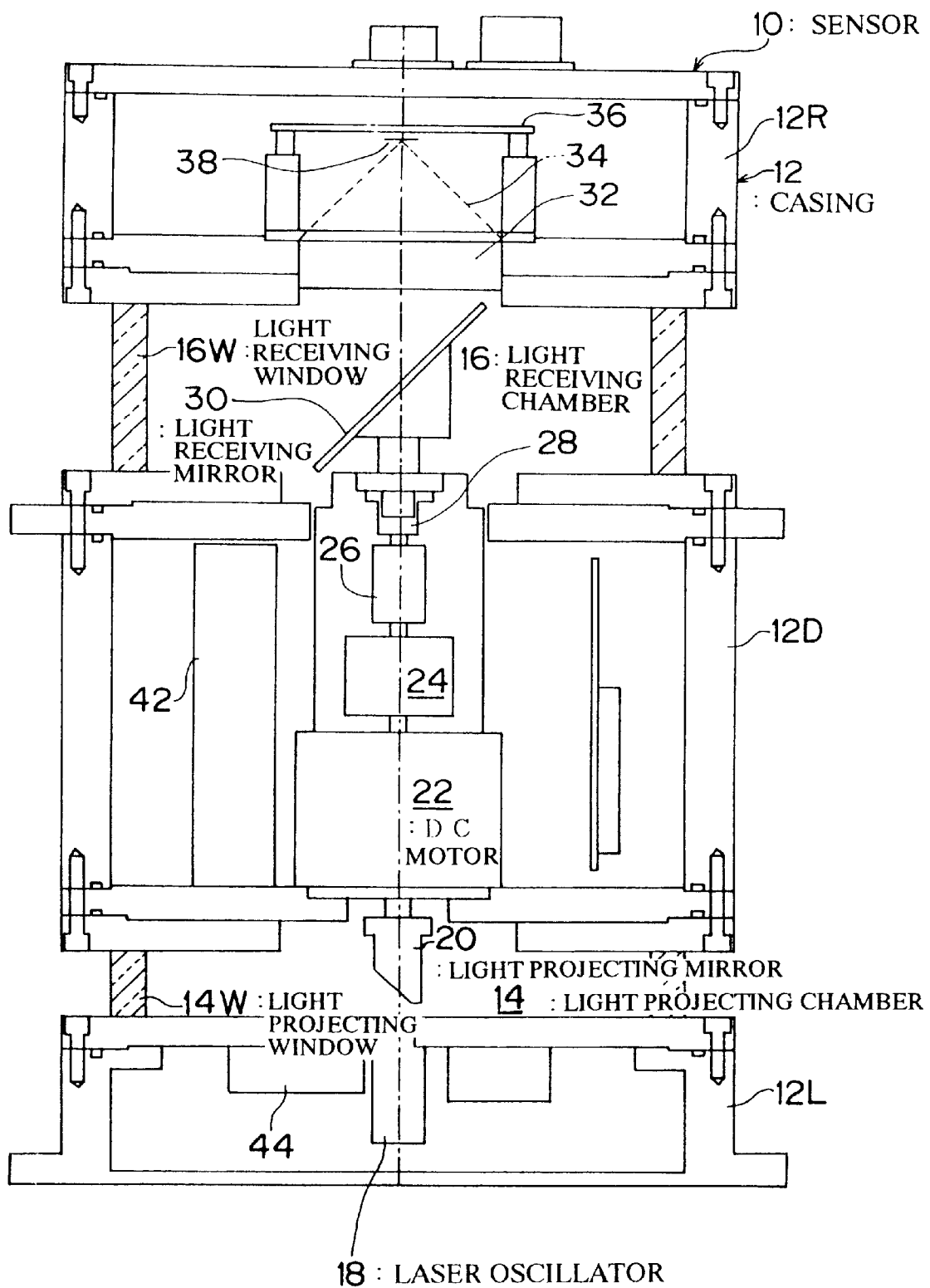
FIG. 1 is a sectional view of the laser obstacle detection sensor relating to the embodiment.

The laser obstacle detection method relating to the present invention, which is an obstacle detection method using a sensor for detecting the presence or the absence of an obstacle by radiating a laser beam radiated from a laser beam source to the outside of a casing through the medium of a light projecting mirror and by letting the reflected light from an obstacle or the like enter a light receiving element through the medium of a light receiving mirror, consists of the steps of comparing a received light signal inputted to the above-described light receiving element to a threshold previously determined by the correlation between a detected distance and light intensity, calculating and outputting the detected distance up to an obstacle or the like based on the received light signal and a light projecting signal when a reflected light with intensity greater than the threshold is detected, and determining the presence or the absence of the obstacle.

The laser obstacle detection sensor related to the present invention is a sensor for detecting the presence or the absence of an obstacle by radiating a laser beam radiated from a laser beam source to the outside of a casing through the medium of a light projecting mirror and by letting the reflected light from an obstacle or the like enter a light receiving element through the medium of a light receiving mirror. The assembly includes a light projecting window and a light receiving window being formed with a space provided between in the above-described casing, with the light projecting mirror being positioned so as to face the above-described light projecting window and with the light receiving mirror being positioned so as to face the above-described light receiving window. So, reflected light directly entering from the above-described light projecting window is prevented from being received. Both of the above-described mirrors are attached to a rotation shaft of a motor provided between both the mirrors, so that the light projection mirror and the light receiving mirror can be synchronously rotated.

In this case, an optical axis of the light radiated to the outside of the casing through the medium of the reflecting surface of the above-described light projecting mirror is set in a higher direction than the horizontal line. Thereby, a laser projected light can be radiated as the laser projection light is rotated in a cone-shaped form.

The sensor according to the invention is characterized by a received light reflecting surface of the above-described light receiving mirror. The reflecting surface is constructed by a combined reflecting surface reflecting light to the above-described light receiving element and having a flat reflecting portion and a curved reflecting surface with varied curvatures.

Further, the sensor according to the invention is characterized by including a light receiving circuit for conducting photoelectric conversion of the received light signal from the above-described light receiving element. Also provided is a threshold setting circuit for precisely setting the threshold by the correlation between the detected distance and the light intensity, and a calculating section for comparing reflection light intensity output from the above-described light receiving circuit to a threshold output signal at the light receiving time from the above-described threshold setting circuit and for outputting the detected distance up to an obstacle when the reflected light intensity output is greater than the threshold output at the light receiving time. So, the presence or absence of an obstacle is determined by the detection of the reflected light intensity with the above-described threshold as a boundary.

More specifically, the present invention has a construction characterized by the light projecting window and the light receiving window being formed with a space provided therebetween in the above-described casing, with the light projecting mirror being positioned so as to face the above-described light projecting window and with the light receiving mirror being positioned so as to face the above-described light receiving window. So, reflected light directly from the above-described light projecting window is prevented from being received. Both of the above-described mirrors are attached to a rotation shaft of the same motor provided between both the mirrors, so that the light projecting mirror and the light receiving mirror can be synchronously rotated. An optical axis of the light radiated to the outside of the casing through the medium of the reflecting surface of the above-described light projecting mirror is set in a direction higher than the horizontal line, and radiated laser projection light is rotated in a cone-shaped form. The received light reflecting surface of the above-described light receiving mirror is constructed by a combined reflecting surface reflecting light to the above-described light receiving element and has a flat reflecting portion and a curved reflecting surface with varied curvatures. The invention includes a light receiving circuit for conducting photoelectric conversion of the received light signal from the above-described light receiving element, a threshold setting circuit for previously setting the threshold by the correlation between the detected distance and the light intensity, and a calculating section for comparing the reflected light intensity output from the above-described light receiving circuit and for outputting the detected distance up to an obstacle when the reflection light intensity output is greater than the threshold output at the light receiving time. So, the presence or absence of an obstacle is determined by detection of the reflected light intensity with the above-described threshold as a boundary.

By the above-described construction, in which the threshold level varying in accordance with a distance is set for the laser reflection light intensity output, misdetection of raindrops or the like caused by rainfall or snowfall as an obstacle is prevented. Specifically, the present invention is made by noticing the fact that the intensity of reflected or reflection light is varied depending on the position of reflecting raindrops at rainfall though the entire level of the intensity of reflected light is low when a radiated laser beam is reflected by raindrops or the like. The invention is also designed from the viewpoint that the reflection light intensity from raindrops at a close distance is sufficiently large while the reflection light intensity decreases as a distance becomes longer. The threshold of the reflection light intensity is set large in case of a short distance, and the threshold is set smaller as the detected distance becomes longer, so that an obstacle is detected when the light intensity is greater than this threshold and raindrops are detected when the light intensity is smaller than the threshold. Therefore, misdetection of raindrops as an obstacle can be prevented. By constructing the assembly so as to separate the light projecting section and the light receiving section up and down, misdetection of a vehicle body and so on as an obstacle, which can occur as a result of picking up the reflection from contacting raindrops, and the reflection light from attaching water directly entering the light receiving mirror can be prevented. These problems occur to the conventional sensor with the light projecting section and the light receiving section provided at the same position. Further, the light receiving mirror is a combined reflecting surface with varied curvatures, so that detection of an obstacle at a short distance is easy and an obstacle in close proximity can be surely detected while misdetection caused by raindrops at a short distance is especially prevented by increasing a detection range. In addition, since the optical axis of the light projected from the projection mirror is set to face in a higher direction than the horizontal line, a ground surface is prevented from being detected as an obstacle when a vehicle is tilted.

A preferable embodiment of the laser obstacle detection method and sensor relating to the present invention will be particularly described below with reference to the drawings.

Figure 2:
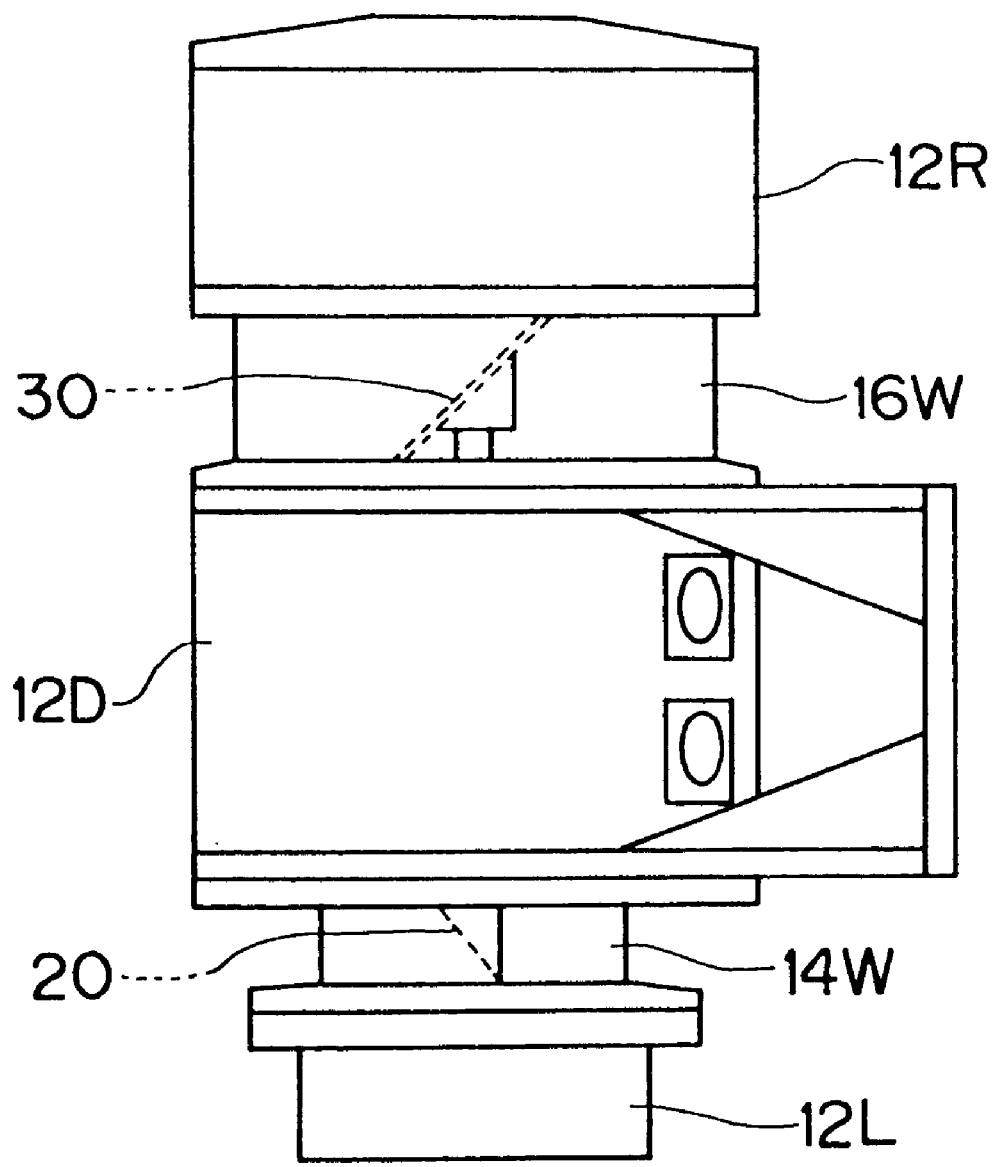
FIG. 2 is a side view showing an external appearance of the same sensor.

FIG. 1 illustrates construction of a laser obstacle detection sensor 10, and FIG. 2 illustrates an external view thereof. As illustrated in the drawings, the sensor 10 includes equipment within a cylindrical casing 12, and is defined by a driving section casing 12D incorporating rotary driving equipment, a light emitting section casing 12L connected to the bottom thereof through the medium of a light projecting chamber 14, and a light receiving casing 12R connected to the top thereof through the medium of a light receiving chamber 16, all of which are formed to be concentric cylinder forms.

As a laser beam source, a semiconductor laser oscillator 18 is used. Being positioned within the light emitting section casing 12L at the lower part of the casing, the semiconductor laser oscillator 18 enables the radiation of laser beam in an upward direction of the center line of the casing toward the inside of the light projecting chamber 14. At a central position of the casing inside the light projecting chamber 14, a light projecting mirror 20 is positioned, and this light projecting mirror 20 reflects the laser beam radiated from the laser oscillator 18 to project the light toward the outside of the casing 12 from a light projecting window 14W forming the side wall of the light projecting chamber 14. The light projecting window 14W is formed of a transparent acrylic plate in an annular from, and is constructed so as to be able to project light outwards from the entire surface around the circumference. In this case, the diameter of the light projecting window 14W is set to be smaller than the diameter of the casing 12 so that a portion of the bottom surface of the driving section casing 12D forms so-called eaves at the top of the light projecting window 14W to prevent raindrops from directly contacting the light projecting window 14W.

Inside the driving section casing 12D positioned on the top of the above-described light projecting chamber 14, attached is a DC motor 22, which has rotating shafts concentric with the central axis of the casing at both ends. At one rotating shaft facing downward of this DC motor 22, the light projecting mirror 20 is attached with the foremost end facing the above-described light projecting room 14. Accordingly, the light projecting mirror 20 can rotate 360 degrees by the rotation of the motor 22, and can project laser emission light outwardly from the above-described light projecting window 14W formed to be annular as a rotating laser beam.

An encoder 24 is attached on the other rotating shaft facing upward of the DC motor 22, and the foremost end of the rotating shaft faces the above-described light receiving chamber 16 through a coupling 26, a shaft bearing 28 and so on further on the encoder 24. At the rotating shaft projecting inside this light receiving chamber 16, a light receiving mirror 30 is attached. This light receiving mirror 30, which is positioned in the area of the central axis of the casing, receives the laser beam entering through the light receiving window 16W forming the side wall of the light receiving chamber 16, and reflects the laser beam in an upward direction along the central axis of the casing so that the laser beam enters the light receiving section casing 12R on the top. Like the light projecting window 14W, this light receiving window 16W is formed of a transparent acrylic plate in an annular form, and is constructed so as to receive laser beams from the outside on the entire surface around the circumference. The diameter of the light receiving window 16W is set to be small like the above-described light projecting window 14W so that the external surface of the window is positioned inside the casing 12 and a portion of the bottom of the light receiving section casing 12R functions as eaves to prevent raindrops from contacting the surface of the window.

Though the light projecting mirror 20 and the light receiving mirror 30 are rotatable by the DC motor 22 as described above, the light projecting direction from the light projecting mirror 20 and the light receiving direction of the light receiving mirror 30 are naturally set to face the same direction seen from the horizontal surface. Even in a rotating condition of 360 degrees by the rotating drive of the motor 22, the light projecting and light receiving directions are set to be synchronized so that when the projected laser beam is reflected from an obstacle and so on, the light receiving mirror 30 can receive the reflected light. Thereby the detection of an obstacle in the area of 360 degrees around the casing 12 is possible. The above-described light projecting window 14W and the light receiving window 16W are separated up and down by the central driving section casing 12D, and the driving section casing 12D on the middle stage prevents the laser beam projected from the light projecting mirror 20 from directly radiating to the light receiving mirror 30, or the light receiving window 16W when the projected laser beam short-cuts.

The reflected light from the light receiving mirror 30 is directed to the central lower surface of the light receiving section casing 12R on the top, and there a honey-comb filter 32 is positioned so that a light receiving circuit 36 receives the light through the medium of a light receiving section optical system 34 such as a condenser and so on. The light receiving circuit 36 is equipped with a photoelectric conversion element 38 so as to convert received light into an electric signal and obtain a received light signal.

Figure 3A:
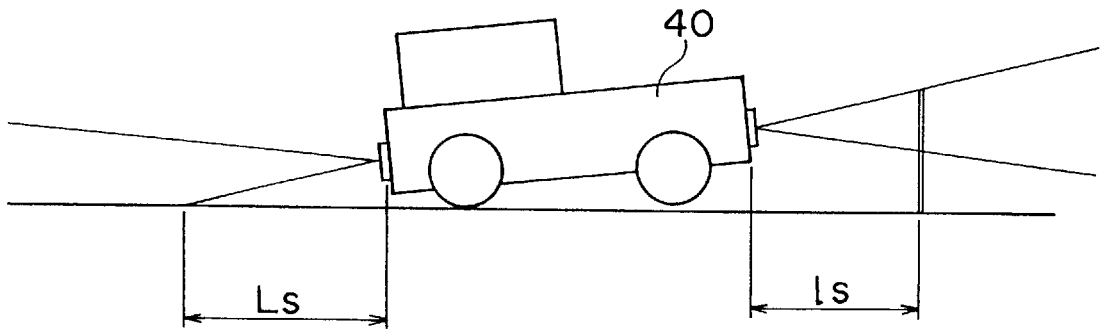
FIGS. 3 (A) to 3 (C) are explanatory views of a sensor detecting range as a result of the inclination of an automated guided vehicle and an explanatory view of a light projecting mirror, and FIG. 3 (A) shows a detecting condition of the conventional sensor, while FIG. 3 (B) shows a detecting condition of the present embodiment and FIG. 3 (C) is a side view of the light projecting mirror.
Figure 3B:
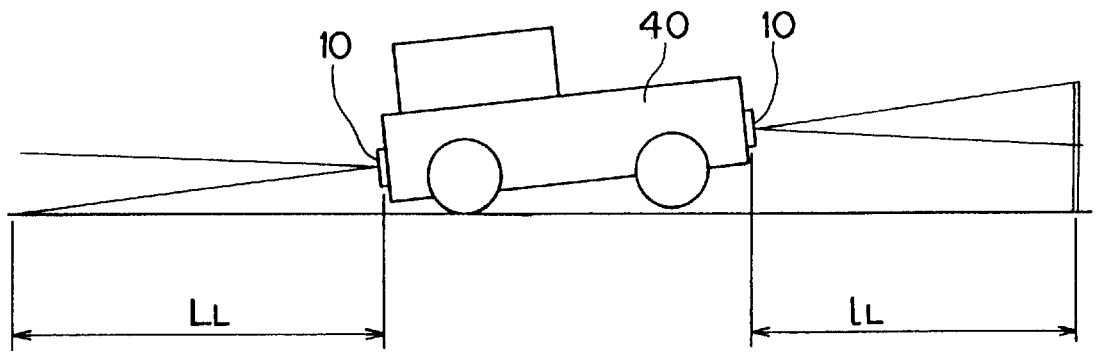
Figure 3C:
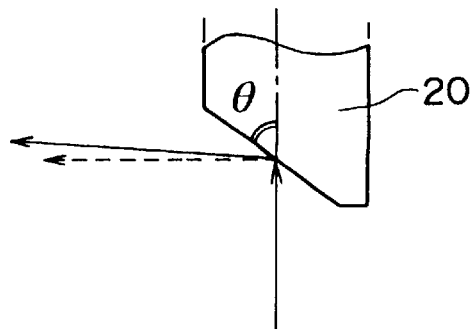

As seen in FIG. 3B, this sensor 10 can be equipped on an automated guided vehicle 40, and it is possible that the vehicle 40 is in a partial loading condition depending on a loaded position of a carried load and that one side of the vehicle 40 is tilted down. In such a condition, it is possible that the sensor 10 detects a ground surface as an obstacle, therefore in this embodiment, as illustrated in FIGS. 3 (A) to 3 (C), a reflecting direction of the light projecting mirror 20 is not set to be orthogonal to the central axis of the casing, but the optical axis of the reflection light of the light projecting mirror 20 is set to face higher than the horizontal line. Thereby when the light projecting mirror 20 is rotated by the motor 22, the projecting laser beam is radiated as it is rotating in a cone-shaped form. Specifically, as FIG. 3 (A) illustrates, when the heavy-weighted side of the vehicle 40 is tilted down at partial loading, the sensor casing 12 secured on the vehicle 40 is also tilted down. Therefore when the laser beam is projected in the direction perpendicular to the shaft core of the casing, the reflection from the ground surface ahead of the vehicle 40 at distance $L_S$ is detected and misdetected as an obstacle. Therefore, as FIG. 3 (B) illustrates, a laser beam projecting outside the casing is set to face an upward direction, so that the distance in which the radiated laser beam reaches the ground surface is set to be a long distance $L_L$ on the heavyweighted side. Specifically, as FIG. 3 (C) illustrates, this can be achieved by setting the inclination of the reflection surface of the light projecting mirror 20 to the shaft core of the casing 12 to be in the angle range of $44°<\theta<45°$, preferably set at $44.5°<\theta<44.7°$, and by setting the projecting angle of the mirror reflection light to be an upward angle with an inclination of below 1° to the horizontal surface, while ordinarily, the reflection surface of the light projecting mirror 20 has an inclination of 45° to the shaft core of the casing 12. In the embodiment, one of the two sensors 10 set at the right and left areas on the front end of the vehicle 40 is set at 44.7°, and the other is set at 44.5°, and by signals from both sensors 10, the presence or the absence of the reflection from the ground surface is detected.

Figure 4A:
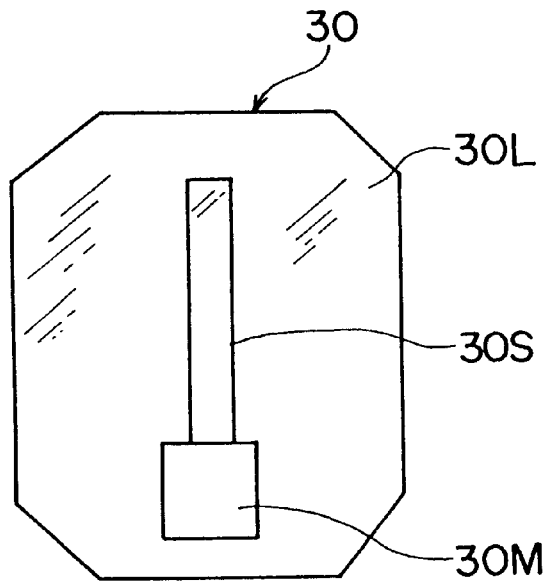
FIG. 4 (A) is a front view of the light receiving mirror, and FIG. 4 (B) is a side view of the light receiving mirror, while FIG. 4 (C) is an explanatory view of a light receiving condition.
Figure 4B:
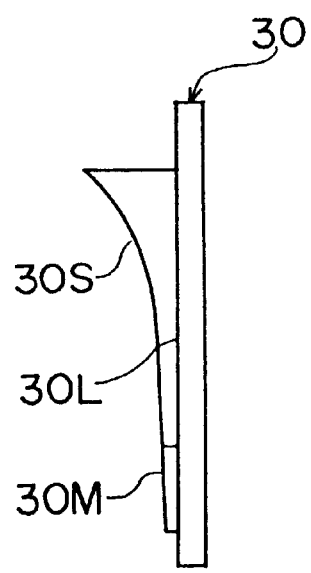
Figure 4C:
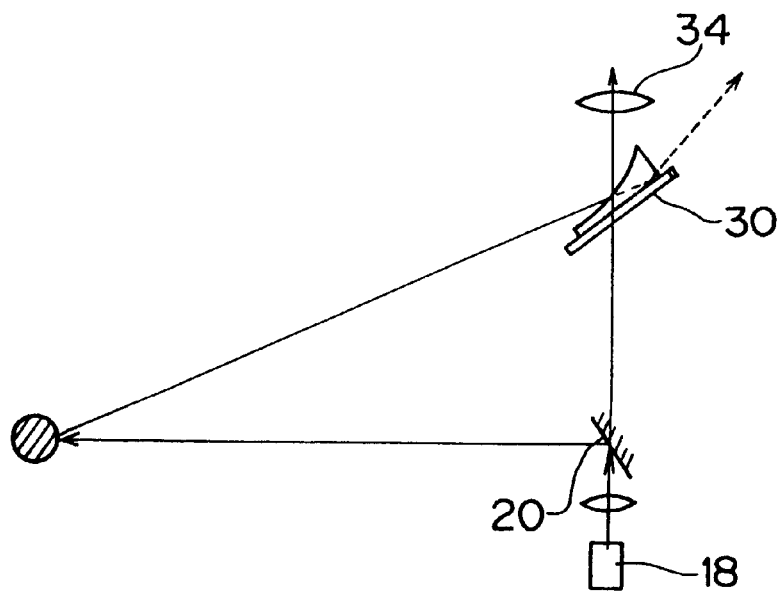

FIGS. 4 (A) to 4 (C) illustrate the details of the light receiving mirror 30 receiving the reflected laser light entering from the outside of the casing 12. As FIG. 1 also illustrates, this light receiving mirror 30 has a combined reflection surface having a planar reflection portion with the reflection surface being set to be a slope of 45° and a curved reflection surface with the curvature of the reflection surface being varied in order that light enters the photoelectric conversion element 38 positioned on the shaft core of the casing 12. Specifically, the light receiving mirror 30 has a raised planar portion being in a reverse T-shaped form in a central portion of a first reflection surface 30L formed to be a polygonal planar surface. At the lower part of this raised portion, a second reflection surface 30M with a small rectangular area for reflection in a medium range is formed, while a third reflection surface 30S for a short range is slenderly raised in a curved upward direction from this second reflection surface 30M. With the raised height being increased from the above-described second reflection surface 30M to the third reflection surface 30S, the raised height is formed by a curve of a secondary degree or a curve of a multiple degree which is set so that the reflected light at each reflection point is parallel to each other. In other words, the focus is farther than the setting position of the honey-comb filter 32 in order that the reflected light at each position on the surface passes through the honey-comb filter 32 defining the light receiving section optical system. When the light reflecting from an obstacle in close proximity enters the light receiving mirror 30, a reflection curved surface can be empirically formed by adjusting a curvature at each reflection point according to a approximate distance in order that the mirror reflection angle can be directed to the honey-comb filter 32. Thereby, the second reflection surface 30M is set to have a gradually increasing tangent inclination angle at a reflection point compared to the first reflection surface 30L, and the third reflection surface 30S is further set to have a further gradually increasing tangent inclination angle at a reflection point. As a result, as FIG. 4 (C) illustrates, in the case of sole use of the first reflection surface 30L, the light reflecting from an obstacle close to the vehicle 40 is deviated from the light receiving range when the light reflects from the mirror surface (a broken line in the drawing), but the light can be received by the second or the third reflection surface 30M or 30S (a solid line in the drawing).

Figure 5:
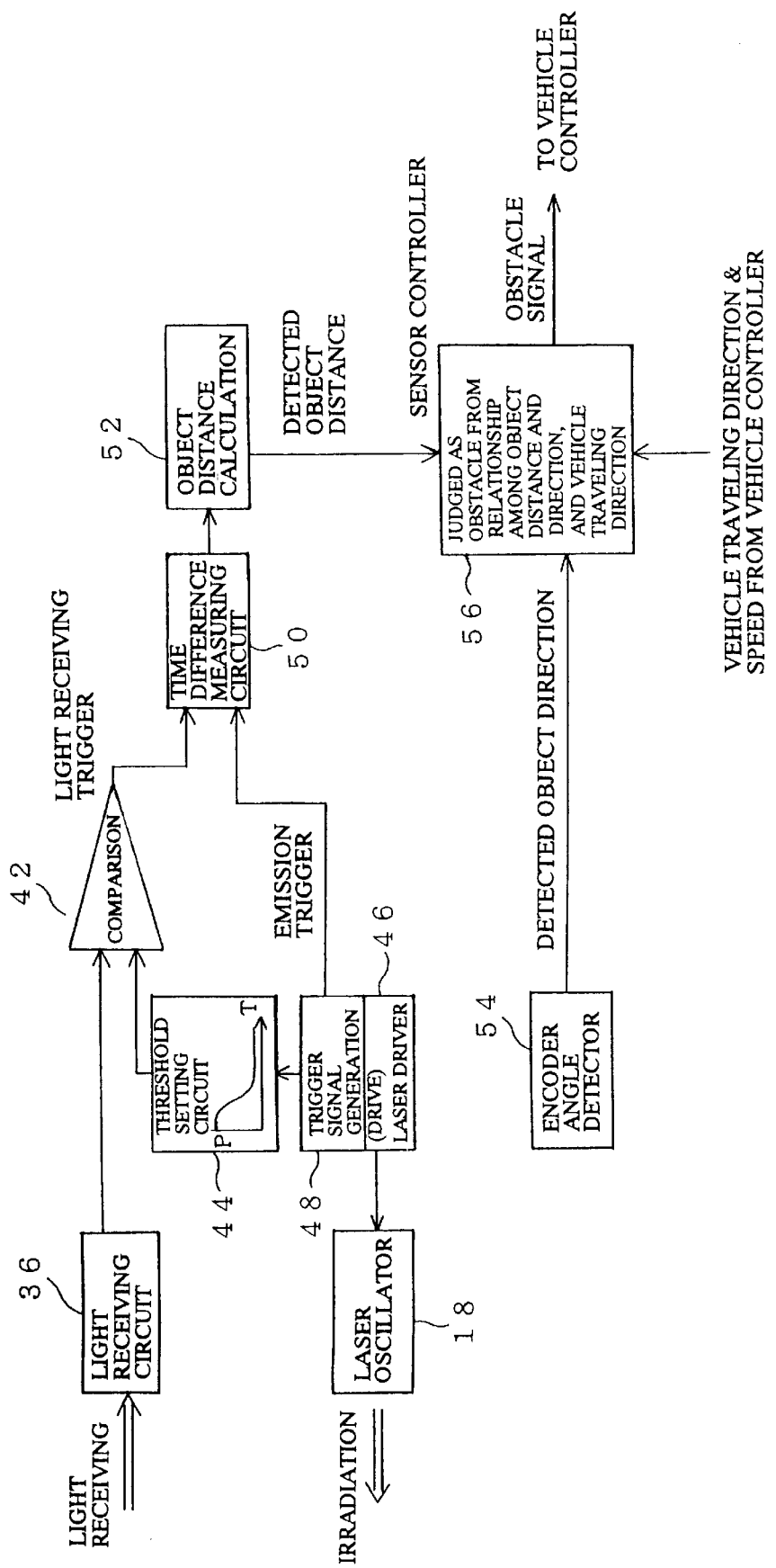
FIG. 5 is a block diagram of the sensor.

The light receiving circuit 36 inputting a received light signal is incorporated in the light receiving section casing 12R, and this circuit detects at least a light intensity signal by conducting photoelectric conversion of the received light signal. This output signal of this light receiving circuit 36 is compared to an output signal from a threshold setting circuit having a correlation between a detected distance (time) and light intensity, and when the received light signal is greater than the threshold, a received light trigger is generated to measure the time from light projecting to light receiving and then to calculate the distance. A preferred construction is illustrated in FIG. 5.

Figure 6:
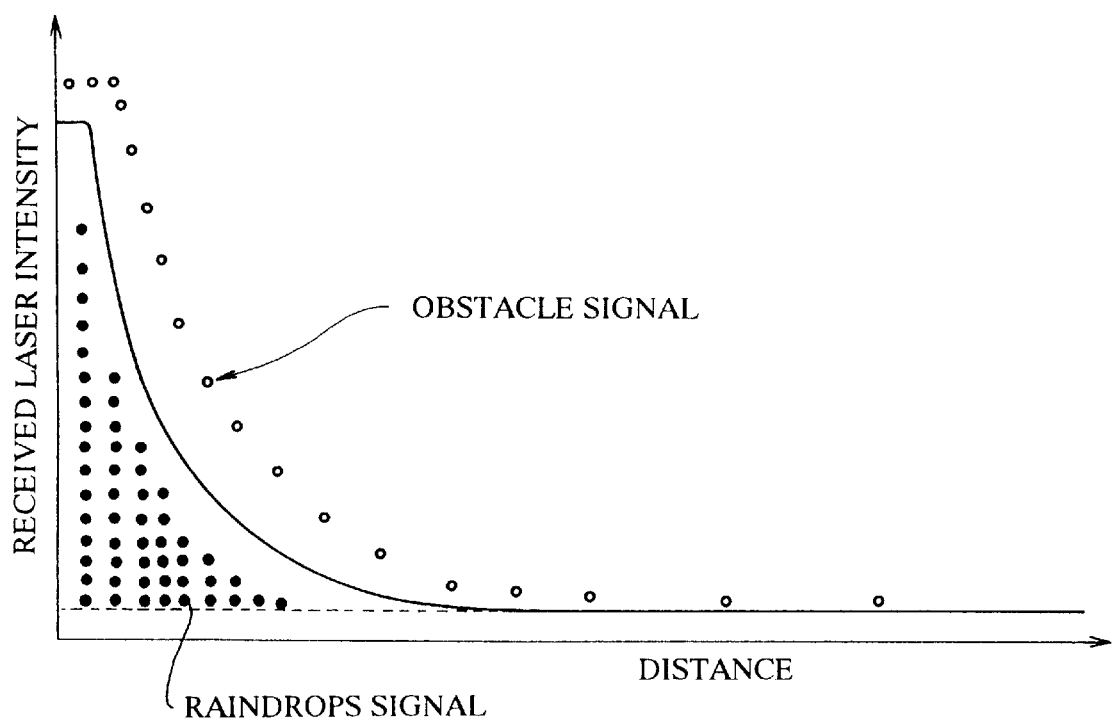
FIG. 6 is an explanatory diagram of the threshold of light intensity.

As illustrated in the drawing, when the light receiving circuit 36 receives the reflection light, the signal as a result of the photoelectric conversion of the reflection light is inputted in a comparator 42. The comparator 42 compares a comparison standard signal to a received light signal, and the standard signal takes in an output signal from a threshold setting circuit 44. That is to say, the comparator 42 compares a set standard light intensity to a received light signal and determines that the received light is caused by rainfall or snowfall and not by an obstacle when receiving the light with the intensity below the standard light intensity, and the standard light intensity is discriminated with a standard signal taken in from the threshold setting circuit as a threshold. This threshold signal is selected especially for excluding the reflected light from raindrops, and the present invention prevents the misdetection of the ghost signal of the raindrops appearing at a short distance as an obstacle by setting a threshold excluding the raindrops as a function of the distance based on the knowledge that the light intensity of the raindrop reflection signal fluctuates according to a distance. That is to say, as FIG. 6 illustrates, when the intensity of the reflected light (● raindrops signal) in the case of the raindrops reflecting light being detected and the intensity of the reflected light (obstacle signal ◌) in the case of an obstacle being detected are obtained by artificially creating a raining condition and by changing the distance between the position of the raindrops and the sensor 10, there appears a tendency closely analogous to a hyperbola function in which at a short distance, the intensity of the reflected light from the raindrops is strong, and in which as the distance is longer, the intensity of the light is reduced. Then, in the threshold setting circuit 44, the threshold regarding the distance is set as a hyperbola function along the raindrops detection range (a solid line in FIG. 6). Alternatively, FIG. 6 can be represented as a table, and likewise, is set as the threshold regarding the distance. The output of this threshold setting circuit 44 is inputted in the comparator 42, and the threshold corresponding to the received light signal output which is to be compared fluctuates according to the distance from the object from which the light reflects. Therefore, a corresponding threshold becomes a comparison standard signal with the time from the light emitting to the light receiving as a distance signal. Therefore, a light emission trigger signal from a trigger signal generating portion 48 of a laser driver 46 attached to the laser oscillator 18 is inputted in the threshold setting circuit 44, and the fluctuated threshold is output to the comparator 42. A received light signal is inputted to the comparator 42, and with the threshold to the corresponding distance (time) according to the light receiving timing as a standard, the signal obtained from the photoelectric conversion by the light receiving circuit 36 is compared to the threshold.

In the comparator 42, by comparing the received reflection light intensity signal to the threshold, when the received light signal is smaller than the threshold, the light signal is judged as a ghost caused by raindrops, and when the received light signal is greater than the threshold, the light signal is regarded as an obstacle. When the light signal is detected as an obstacle, received light trigger is outputted to a time difference measuring circuit 50 in order to calculate the distance. At the same time light emission trigger from the above-described trigger signal generating portion 48 is inputted to the time difference measuring circuit 50, and the time difference signal of both triggers are calculated and outputted to an object distance calculating circuit 52, where the distance to the detected object is obtained.

The detected object distance which is obtained, with the signal from an angle detector 54 detecting a radiation angle by the signal from the encoder 24, is outputted to a sensor controller 56. The sensor controller 56 inputs each signal of a vehicle traveling direction and a vehicle speed from a vehicle controller (not illustrated) at the same time. By determining whether the detected object is an obstacle or not from the relationship among the detected object distance and direction, and the vehicle traveling direction, when the detected object is judged as an obstacle, an obstacle signal is outputted to the vehicle controller. In the vehicle controller, an obstacle signal generating means is actuated, and various kinds of corresponding measures are conducted such as the generation of a warning sound as a dangerous signal, a warning display, automatic halting of the guided vehicle 40, or the like.

A pair of the laser obstacle detection sensors 10 constructed as in the above are attached at right and left portions of the front edge of the automated guided vehicle 40, and radiates a laser beam oscillated from the laser oscillator 18 from the light projecting window 14W to the outside through the light projecting mirror 20. The light projecting mirror 20 is rotated by the motor 22, and accordingly, the laser beam is continuously radiated over the range of 360° in a direction of the circumference as the laser beam is rotating. Since the reflection surface of the light projecting mirror 20 is set to face higher than the horizontal surface at this time, the reflection surface is rotated in a cone-shaped form, so that a ground surface at short distance is prevented from being detected as an obstacle, even if the vehicle 40 is partially loaded with a heavy load. At this time, if the set angles in an upward direction of the right and left sensors 10 are made to be different so that an obstacle detected by only one of the light received signals of both sensors 10 is excluded, a ground surface is prevented from being detected as an obstacle.

When a laser beam rotatively radiated is reflected by an obstacle or the like, this reflection enters through the light receiving window 16W of the sensor 10 and then enters the light receiving circuit 36 through the medium of the light receiving mirror 30. Since the light receiving mirror 30 is connected to the motor 22 and is rotated synchronously with the light projecting mirror 20, the light receiving mirror 30 can receive the reflected light from the obstacle at the same position. Since this light receiving position and the light projecting position are separated up and down by the driving section casing 12D and the windows 14W and 16W are not directly connected, a short-cut laser beam is prevented from being received and the reflection from the raindrops contacting on the windows 14W and 16W are not received if any raindrops are contacting on the windows 14W and 16W. In the light receiving mirror 30, the second mirror 30M for a medium range and the third mirror 30S for a short range which are curved with a specified curvature are formed in the central portion of the flat first mirror 30L. When an obstacle approaches in close proximity to the vehicle 40, the reflection from the obstacle can enter the light receiving section as long as the reflection enters through the light receiving window 16W. Thereby, the detection at short distances can be achieved and a dead zone can be decreased as much as possible.

The photoelectric conversion of the reflected light entering through the light receiving mirror 30 is conducted by the photoelectric conversion element 38, and the light intensity signal is inputted to the comparator 42 in the light receiving circuit 36. The light intensity threshold regarding the distance up to the reflection object is inputted to the comparator 42 with the light emission trigger signal as the starting point, and then the threshold corresponding to the timing at which the received light signal is inputted is set. When the photoelectric conversion output signal is greater than this standard threshold, the comparator 42 outputs a light receiving trigger, from which along with the light emission trigger signal from the trigger signal generating portion 48 in the light projecting section, the time difference from the light emission to the light receiving is obtained by the time difference measuring circuit 50 and the distance up to the detected object is detected in the distance calculating section 52. This distance signal is not outputted when the received light is the reflection from raindrops, and even when the received light signal is at a short distance with high intensity, the received light signal is blocked by the threshold corresponding to the distance, so that the distance signal is not outputted as a result of being judged as a ghost caused by rainfall or snowfall when the light received signal is less than the threshold. Conversely, when the distance signal is outputted, the reflected light is recognized as being from an object with material substance, therefore the sensor controller 56 outputs an obstacle signal after comparing the distance signal with the traveling direction of the vehicle, and a measure can be taken against the obstacle by generating a warning sound, halting the vehicle 40, or the like.

Though in the above-described embodiment, an example equipped on the automated guided vehicle 40 is cited, the present invention is not limited to this example.

As described in the above, by the present invention, the obstacle detection method uses a sensor detecting the presence or the absence of an obstacle by radiating a laser beam radiated from a laser beam source to the outside of the casing through the light projecting mirror and then by letting the reflected light from an obstacle or the like enter the light receiving element through the light receiving mirror. By this, it is determined whether the reflected light is from raindrops or the like, or not, by comparing the received light signal output to be inputted to the above-described light receiving element to the threshold previously determined based on the correlation between the detected distance and light intensity. When the obstacle has material substance, the detected distance up to the obstacle or the like is calculated and outputted to determine the presence or the absence of the obstacle. Therefore, the present invention is especially useful to be equipped on an automated guided vehicle (AGV), and raindrops and so on are not misdetected as obstacles.

In the sensor detecting the presence or the absence of an obstacle by radiating a laser beam radiated from a laser beam source to the outside of the casing through the light projecting mirror and then by letting the reflected light from an obstacle or the like enter the light receiving element through the light receiving mirror, light directly reflected from the above-described light projecting window is prevented from being received by forming the light projecting window and light receiving window with a space provided between them. The light projecting mirror is positioned so as to face the above-described light projecting window and the light receiving mirror is positioned so as to face the above-described light receiving window. Thus, the effects of preventing misdetection of the raindrops attached to the light projecting and light receiving windows of the laser beam and of preventing misdetection of the ground surface as an obstacle are obtained by enabling synchronized rotation of the light projecting mirror and light receiving mirror by attaching both of the above-described mirrors at the rotation shaft of the same motor provided between both mirrors, by rotating and radiating the light projecting laser in a cone-shaped form with the optical axis radiated to the outside of the casing by the medium of the reflection surface of the light projecting mirror being set in a higher direction than the horizontal line, and by constructing the light receiving reflection surface of the light receiving mirror by a combined reflection surface having the flat reflection portion and the curved reflection surface with varied curvatures to reflect to the above-described light receiving element.

What is claimed is:

1. A laser obstacle detection method that uses a sensor disposed in a casing for detecting the presence or the absence of an obstacle outside of the casing by radiating a laser light beam from a light source to the outside of the casing and when a potential obstacle is present receiving light reflected from the potential obstacle to a light receiving element disposed in the casing, the method comprising the steps of:

determining a threshold light intensity signal based on a correlation of detected distance and light intensity;

radiating a laser light beam outward from the casing and generating a light projecting signal;

receiving a light beam reflected back to the light receiving element and generating a light receiving signal;

comparing the generated light receiving signal to the threshold light intensity signal;

calculating and outputting a distance detected to a potential obstacle based on the generated light receiving signal and the light projecting signal when the reflected light beam has an intensity greater than the threshold light intensity signal; and determining whether the potential obstacle is an obstacle based on a relationship between the detected distance and a relative direction of the sensor to the potential obstacle.

2. The laser obstacle detection method of claim 1 wherein the step of radiating a laser light beam outward from the casing includes reflecting the laser beam with a light projecting mirror.

3. The laser obstacle detection method of claim 1 wherein the step of receiving a light beam reflected back to the light receiving element includes using a light receiving mirror disposed in the casing.

4. The laser obstacle detection method of claim 1 wherein the step of determining a threshold light intensity signal based on a correlation of detected distance and light intensity includes establishing a plurality of predetermined threshold values based on intensity of the light beam reflected to the light receiving element and distance, resulting in a generally hyperbolic relationship.

5. A laser obstacle detection sensor assembly for detecting presence of an obstacle using light radiated from a light source and reflected back from a potential obstacle, comprising:

a casing from which light is radiated therefrom, the casing having a central driving section;

a light projecting window formed in the casing;

a light projecting mirror disposed in the casing facing the light projecting window;

a light receiving window formed in the casing, the light receiving window being spaced from the light projecting window, wherein the central driving section is located between the light projecting window and the light receiving window and extends outwardly from the light projecting window and light receiving window thus forming an eave that prevents raindrops from directly contacting the light projecting window;

a light receiving mirror disposed in the casing facing the light receiving window to prevent light directly reflected from the light projecting window from entering the light receiving window; and a drive source housed in the central driving section and coupled to the light projecting mirror and the light receiving mirror that drives the light projecting mirror and the light receiving mirror in synchronous rotation.

6. The laser obstacle detection sensor assembly of claim 5 wherein the drive source comprises a single motor with a rotation shaft that supports the light receiving mirror and the light projecting mirror.

7. The laser obstacle detection sensor assembly of claim 5 wherein the drive source comprises motors having drive shafts that are synchronously rotatable and that support the light receiving mirror and the light projecting mirror.

8. The laser obstacle detection sensor assembly of claim 5 wherein the light projecting window and the light receiving window are annular and provide 360 degree radiation and receipt of light.

9. The laser obstacle detection sensor assembly of claim 5 wherein the light projecting mirror has a reflecting surface with an optical axis that is disposed in a direction higher than horizontal and light is reflected from the reflecting surface in a cone-shaped form.

10. A laser obstacle detection sensor assembly for detecting presence of an obstacle using light radiated from a light source and reflected back from a potential obstacle, comprising:

a casing from which light is radiated therefrom;

a light projecting window formed in the casing;

a light projecting mirror disposed in the casing facing the light protecting window;

a light receiving window formed in the casing, the light receiving window being spaced from the light projecting window;

a light receiving mirror disposed in the casing facing the light receiving window to prevent light directly reflected from the light projecting window from entering the light receiving window; and a drive source coupled to the light protecting mirror and the light receiving mirror that drives the light projecting mirror and the light receiving mirror in synchronous rotation, wherein the light receiving mirror has a reflecting surface including a flat reflecting portion and a curved reflecting portion having varied curvature.

11. A laser obstacle detection sensor for detecting presence of an obstacle based on a light radiated from the sensor and reflected back to the sensor, comprising:

a light receiving element that receives a light signal reflected back from a potential obstacle;

a light receiving circuit connected to the light receiving element that converts the received light signal into a photoelectric signal representative of reflected light intensity;

a threshold setting circuit that generates a preset threshold output signal based on a correlation between a distance from an obstacle and light intensity; and a determiner coupled to the threshold setting circuit and the light receiving circuit that compares the photoelectric signal of reflected light intensity to the preset threshold output signal and, when the photoelectric signal of reflected light intensity is greater than the threshold output signal, determines the presence of the obstacle.

12. The laser obstacle detection sensor of claim 11, wherein the determiner also determines a distance to the obstacle.

13. The laser obstacle detection sensor of claim 11 wherein the threshold setting circuit sets a plurality of predetermined threshold values based on intensity of light beam reflected to the light receiving element and distance, resulting in a generally hyperbolic relationship.

14. A laser obstacle detection sensor assembly for detecting presence of an obstacle using light radiated from a light source and reflected back from a potential obstacle, comprising:

a casing from which light is radiated therefrom;

a light projecting window formed in the casing;

a light projecting mirror disposed in the casing facing the light projecting window;

a light receiving window formed in the casing, the light receiving window being spaced from the light projecting window;

a light receiving mirror disposed in the casing facing the light receiving window to prevent light directly reflected from the light projecting window from entering the light receiving window;

a drive source coupled to the light projecting mirror and the light receiving mirror that drives the light projecting mirror and the light receiving mirror in synchronous rotation;

a light receiving element coupled to the light receiving mirror that receives a light signal from light reflected back from the potential obstacle;

a light receiving circuit connected to the light receiving element that converts the received light signal into a photoelectric signal representative of reflected light intensity;

a threshold setting circuit that generates a preset threshold output signal based on a correlation between a distance from an obstacle and light intensity; and a determiner coupled to the threshold setting circuit and the light receiving circuit that compares the photoelectric signal of reflected light intensity to the preset threshold output signal and, when the photoelectric signal of reflected light intensity is greater than the threshold output signal, determines the presence of the obstacle.

15. The laser obstacle detection sensor assembly of claim 14 wherein the light projecting mirror has a reflecting surface with an optical axis that is disposed in a direction higher than horizontal and light is reflected from the reflection surface in a cone-shaped form.

16. The laser obstacle detection sensor assembly of claim 15 wherein the light receiving mirror has a reflecting surface including a flat reflecting portion and a curved reflecting portion having varied curvature.

17. A laser obstacle detection sensor assembly that detects the presence of an obstacle, comprising:

a laser light source that radiates a laser light beam;

a light projecting mirror that reflects the laser light beam toward a potential obstacle;

a light receiving element that receives light reflected back from the potential obstacle; and a light receiving mirror that reflects light from the potential obstacle to the light receiving element, wherein the light receiving mirror has a reflecting surface including a flat reflecting surface and raised elongate reflecting surface generally centrally disposed on the flat reflecting surface, the raised reflecting surface having a curved projecting portion.

18. The laser obstacle detection sensor assembly of claim 17, wherein the raised reflecting surface has a generally T-shape.

19. The laser obstacle detection sensor assembly of claim 17, wherein the curved projecting portion has more than one radius of curvature.

20. The laser obstacle detection sensor assembly of claim 17, wherein the curved projecting portion flares upwardly to a projecting point.

* * * * *